United States Patent

Loewe et al.

[11] Patent Number: 5,222,681
[45] Date of Patent: Jun. 29, 1993

[54] LIGHTTIGHT CASSETTE

[75] Inventors: Erhard E. Loewe, Waldesch; Otfried Urban, Wiesbaden, both of Fed. Rep. of Germany

[73] Assignee: E. I. du Pont de Nemours and Company, Wilmington, Del.

[21] Appl. No.: 663,002

[22] Filed: Mar. 1, 1991

[30] Foreign Application Priority Data

Mar. 1, 1990 [DE] Fed. Rep. of Germany ... 9002411[U]

[51] Int. Cl.$^5$ .................. B65D 85/67; G03B 1/04; G03B 17/26
[52] U.S. Cl. .................. 242/71.1; 242/71.7; 242/55.53; 206/409
[58] Field of Search ......... 242/71, 71.1, 71.7, 242/71.8, 55.53; 352/72, 75, 78 R; 354/275, 277; 206/409, 316, 389, 391, 397, 53, 403, 404, 405, 408, 414, 415, 416

[56] References Cited

U.S. PATENT DOCUMENTS

| | | |
|---|---|---|
| 4,079,835 | 3/1978 | Kendig ............... 206/408 X |
| 4,239,164 | 12/1980 | Barnsbee et al. |
| 4,272,035 | 6/1981 | Sherman et al. ............ 242/71.1 |
| 4,333,615 | 6/1982 | Kluczynski et al. ......... 242/71.1 |
| 4,420,120 | 12/1983 | Raymond ................... 242/71.7 |
| 4,634,071 | 1/1987 | Hertel ....................... 242/71.1 |
| 4,706,904 | 11/1987 | Raymond ................. 242/71.1 X |
| 4,956,908 | 9/1990 | Morse et al. ............. 242/71.1 X |
| 4,962,401 | 10/1990 | Tokahashi ................ 242/71.1 X |
| 4,988,054 | 1/1991 | Morse et al. ............. 242/71 X |
| 5,053,795 | 10/1991 | Wyman ................... 242/71.1 X |

Primary Examiner—Daniel P. Stodola
Assistant Examiner—John P. Darling
Attorney, Agent, or Firm—Thomas H. Magee

[57] ABSTRACT

A lighttight cassette for supporting a roll of web material has a housing that includes a variable width dispensing slot formed by two sections of the housing and running substantially parallel to the axis of the supported roll. Both housing sections are positioned with respect to each other under preloaded tension so that the slot assumes its greatest width A. A tensioning device opposes the preloaded tension and is capable of externally adjusting the width of the dispensing slot.

8 Claims, 2 Drawing Sheets

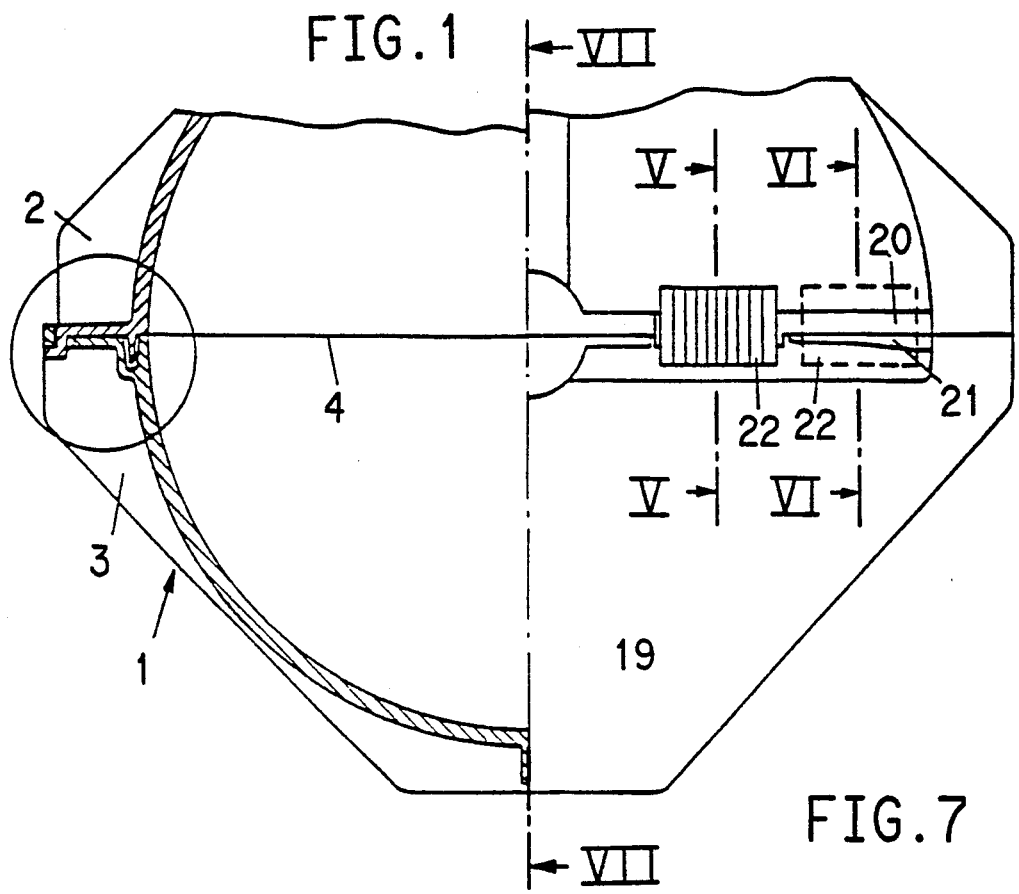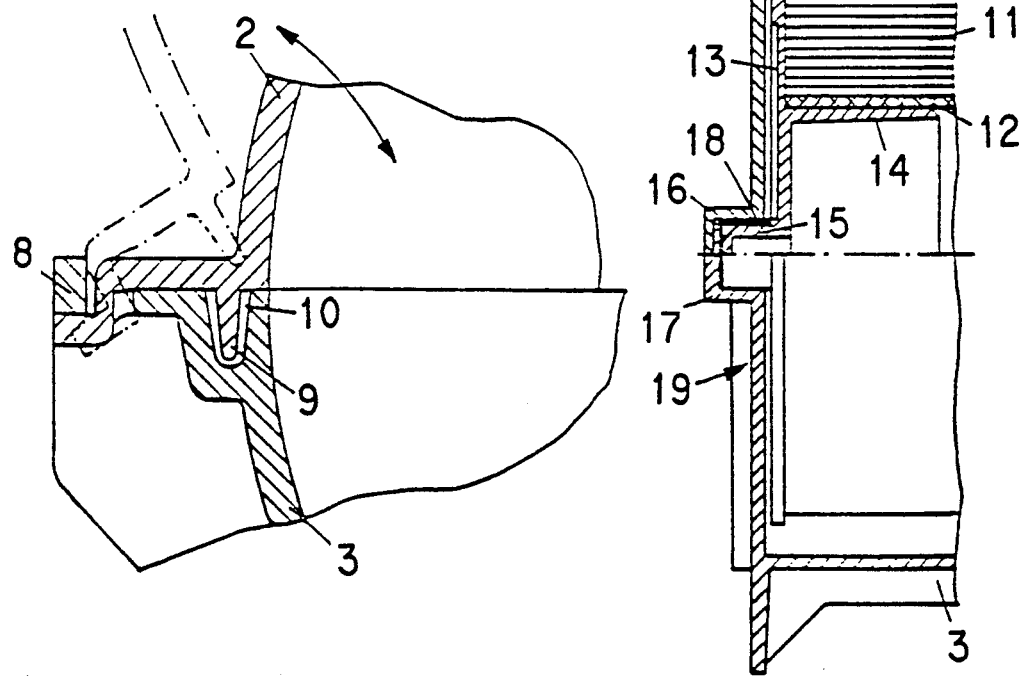

LIGHTTIGHT CASSETTE

BACKGROUND OF THE INVENTION

1. Field of the Invention

This invention pertains to a lighttight cassette for a roll of web material, with a housing that has a dispensing slot formed by two housing sections. The slot runs essentially parallel to the axis of the roll and has an adjustable width.

2. Description of Related Art

This type of cassette is loaded, as a rule, with light-sensitive material wound on a roll and must fulfill several, partially contradictory requirements. The cassette must also be locked lighttight in the area of the dispensing slot. On the other hand, the web material, for example, a light-sensitive film, should not be scratched on being withdrawn from the cassette; that is, in the area of the dispensing slot, the material should be passed through the slot without being pinched or abraded by the housing. Furthermore, the forces required to unroll the material uniformly should not be too high, because this adversely affects smooth transport of the material. On the other hand, the beginning of the web should not be retracted unintentionally into the cassette during transport of the cassette.

For cost reasons, such a cassette should also be suitable for various thicknesses of the web, such as film or paper; that is, the dispensing slot width must be adapted to each web thickness.

In a known cassette (German 29 50 624 A1), the housing sections are under preloaded spring tension and are brought together with spring action. Therefore, the leading end of the film is normally clamped in the dispensing slot. A tug on the film applies on the one housing section a force that is directed so as to widen the slot. The slot then becomes wide enough so that the film contacts only the lower housing section. This prevents the coated outer side of the moving film from coming into contact with the other housing section and being scratched. In this design, the risk of the coated side of the film being scratched is indeed relatively low. Conversely, the risk of the other side of the material being scratched is that much higher. In order to be able to actually withdraw the film from the cassette, considerable tensile stress is required. On the one hand, this must accomplish transporting the film out of the cassette, and on the other hand, this must overcome the spring closure force of the lower cassette section in order to hold the dispensing slot open.

The object of the present innovation is to provide a lighttight cassette that enables uniform unwinding of web material of various thicknesses without scratching, even in exposure devices, for example, scanners, that apply very low tensile stress.

SUMMARY OF THE INVENTION

The present invention comprises a lighttight cassette for supporting a roll of web material. The cassette has a housing that includes a variable width dispensing slot formed by two sections of the housing and running substantially parallel to the axis of the supported roll. Both housing sections are positioned with respect to each other under preloaded tension so that the slot assumes its greatest width A. A tensioning device opposes the preloaded tension and is capable of externally adjusting the width of the dispensing slot.

BRIEF DESCRIPTION OF THE DRAWINGS

FIG. 1 is a side, partially cutaway view showing a cassette with a locking clamp in the aperture position.

FIG. 2 is an enlarged detail view showing a circled section from FIG. 1.

FIG. 7 is a cross-sectional view taken along line VII—VII of FIG. 1.

DETAILED DESCRIPTION OF THE PREFERRED EMBODIMENTS

Figure 3:
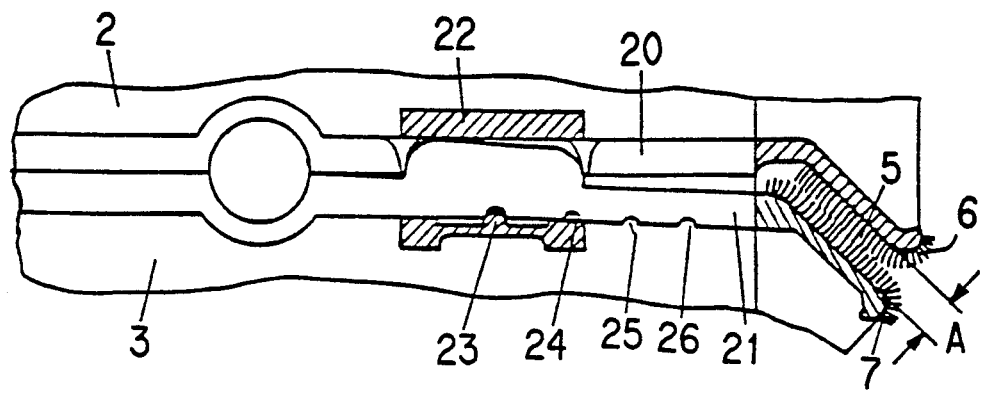
FIG. 3 is an enlarged, partially cutaway elevation view showing the locking clamp of FIG. 1 in the aperture position.

FIGS. 1 through 4 show a cassette 1 having a top part 2 and a bottom part 3, that are connected with the formation of a joint 4. A segment of the joint 4 forms the dispensing slot 5. The walls of the dispensing slot 5 are lined with plush strips 6 and 7. The top part 2 and the bottom part 3 are connected together on the side opposite the slot by a hinged pin assembly 8. The top part 2 has a preloaded spring 9 inserted into a groove 10 in the bottom part 3. These measures assure that no light can reach the interior of the cassette 1 through the joint.

FIG. 7 shows a roll 11 of web material, for example, film supported inside the cassette. The film is wound on a cardboard core 12. Flanged disks 13 that prevent telescoping of the roll 11 are located on both ends of the cardboard core. Each flanged disk 13 has a bearing flange 14 onto which the cardboard core 12 is inserted and which assures the connection between the flanged disk 13 and the cardboard core 12. The flanged disk 13 also connects the bearing flange 14 and a journal 15 by which the roll 11 is supported in the housing. The top part of the housing 2 comprises an upper half 16 of a bearing shell, and the lower part of the housing 3 comprises a lower half 17 of a bearing shell, into which the journal 15 is inserted. A bearing box 18 of low-friction synthetic resin is placed between the halves of the bearing shells 16 and 17 and the journal 15. The bearing box 18 of low-friction synthetic resin reduces friction between the journal 15 and the halves 16, 17 of the bearing shell, and thereby reduces the tensile force needed to unwind the roll 11. Acetal resins, for example, DELRIN ®, sold by the applicant, are particularly suitable are low-friction synthetic resins.

FIG. 3 shows that, when the top part 2 and the bottom part 3 are joined together through the hinged pin assembly 8, the dispensing slot has a width A due to an initial tension caused by the interaction of the hinged pin assembly 8 and the journal 15 with the bearing shell halves 16 and 17. For this reason, guide rails 20 and 21 are provided on each end 19 of the cassette 1 on the top part 2 and the bottom part 3. A locking clamp 22 can be moved on these rails. The locking clamp 22 is shown in two positions in FIG. 1. The first position, designated by solid lines, is a so-called "aperture position", and the other position designated by dashes is a so-called "closed position". The guide rails 20 and 21 are wedge-shaped, that is, the top edges are spaced more widely apart as the distance from the journal 15 increases.

Therefore, if the locking clamp 22 is moved outward, that is, away from the journal 15, the tracks 20 and 21 and consequently, the top part 2 and bottom part 3 are moved progressively toward each other in the area of the dispensing slot 5. When the locking clamp is in the closed position, the dispensing slot has a width B. In this position, a web end that has been unwound from roll 11 is clamped in the dispensing slot 5. The difference between width A of the dispensing slot 5 in the aperture position of locking clamp 22 and width B in the closed position of locking clamp 22 is not very large. On one hand, however, it suffices to ensure reliable clamping of the end of the film if the locking clamp 22 is on the closed setting. On the other hand, width A is large enough to permit friction-free movement of the film out of the cassette 1, if the locking clamp 22 has been shifted to the aperture setting.

Figure 4:
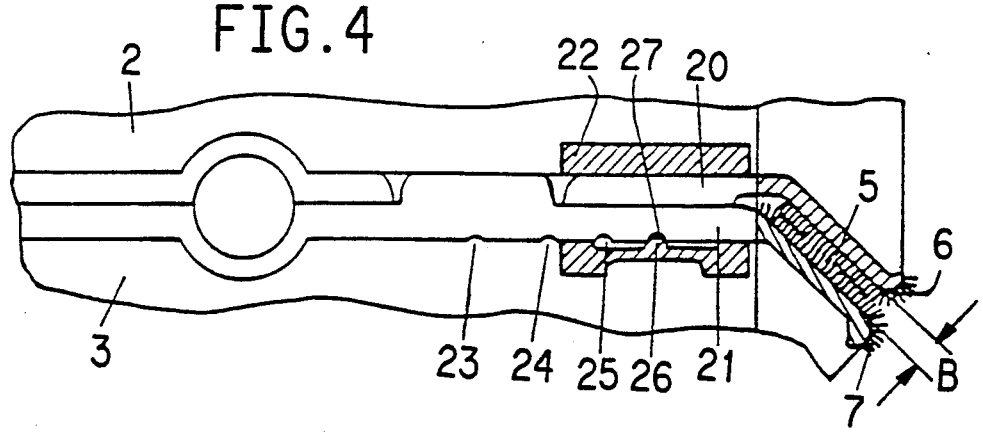
FIG. 4 is a partially cutaway elevation view similar to FIG. 3 showing the locking clamp in the closed position.
Figure 5:
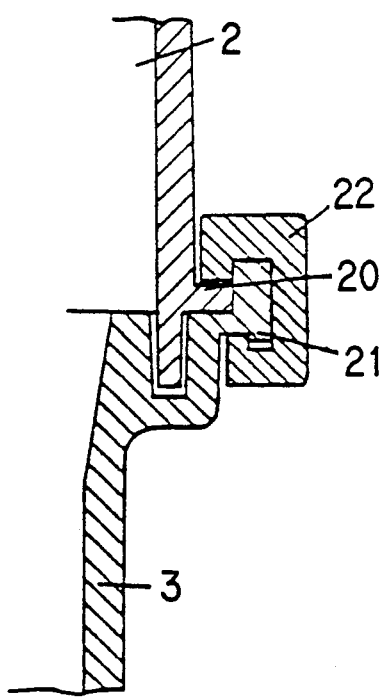
FIG. 5 is a cross-sectional view taken along line V—V of FIG. 1.
Figure 6:
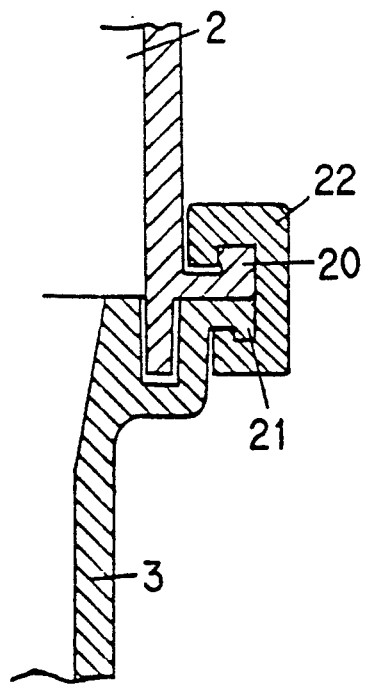
FIG. 6 is a cross-sectional view taken along line VI—VI of FIG. 1.

The bottom guide rail 21 has four detent grooves 23 through 26 into which can fit a protrusion 27 on the locking clamp 22. A specific width of the dispensing slot 5 is assigned to each setting represented by the detent grooves 23 through 26. As shown in FIGS. 3 and 4, width A of the dispensing slot 5 is assigned to detent position 23, whereas width B is assigned to detent position 26. The widths of the dispensing slot for detent positions 24 and 25 lie between widths A and B. Thus, one cassette can use different widths for the material on roll 11. The width of the dispensing slot 5, specifically during unwinding, must be set only slightly larger than the thickness of the material to be unwound. This decreases most significantly the risk of undesired incident light.

If the locking clamp 22 is moved into its closed position, the top part 2 and bottom part 3 are brought together in the area of the dispensing slot. Because the top part 2 and bottom part 3 are joined together by the hinged pin assembly 8, they also come together correspondingly in the area of the journal 15, that is, the bearing shell halves 16 and 17 are brought together similarly and clamp the journal 15, including the bearing box 18, between them, thus preventing rotation of the roll 11. A single manipulation, namely shifting the locking clamp 22 into the closed position, thus can achieve clamping the end of the film securely in the dispensing slot 5 and preventing further rotation of the roll 11. In this manner, the roll 11 can be maintained at its original tension during transport of the cassette 1. Therefore, there is no risk that the roll will twist and the outer layer of the roll 11 will touch the inner wall of the cassette 1 and become scratched. When the cassette has to be used, for example, when it is installed in an exposure device, both locking clamps 22 on both ends are shifted to a detent position 23 through 25 corresponding to the material to be unwound from the roll 11. This opens the dispensing slot 5 enough to ensure easy withdrawal of the material without scratching its surface.

In the present invention, the two housing sections 2 and 3 are placed together under preloaded tension so that the slot assumes its greatest width, and a tensioning device opposing the preloaded tension is provided for external adjustment of the width of the dispensing slot. In contrast to the known configuration, the dispensing slot in the "standby setting" is not closed, but rather is open. At this setting, the material can be dispensed through the slot without, in practice, contacting the housing, or in case contact with the housing does occur, with low abrasion. This is the desired situation for using the cassette, for example, in an exposure apparatus. In this case, the film transport device can be set up for uniform movement of the film, that is, of the web material, without having to apply the sometimes considerable forces required in the current state of the art to withdraw the film from the cassette. To transport the cassette, for example, from the loading area to the use area, the tensioning device is actuated to externally adjust the width of the dispensing slot. As the web material usually is not withdrawn from the cassette while the cassette is being transported, there is no adverse consequence if the width of the slot is reduced to the point where the two housing sections are brought into contact with the material. In this position, the dispensing slot is closed practically speaking in a lighttight manner. Normally, the dispensing slot is bent in the direction of movement of the web material, so that lighttightness is assured if both housing sections do not accurately fit together. Furthermore, in exposure devices that apply only very light tensile stress, such as, for example, certain scanners, uniform unwinding of the film can be achieved.

However, it is advantageous to be able to close the dispensing slot with a locking position of the tensioning device so that the web material can be clamped between the housing sections. On one hand, this provision prevents light entry into a cassette with a straight line dispensing slot. On the other hand, the starting end of the web material to be dispensed is clamped so that it is prevented from retracting unexpectedly into the cassette.

In an especially preferred embodiment, the housing is a two-piece structure with top and bottom parts that are connected together in a separable manner, particularly along the wall opposite the dispensing slot. The dispensing slot forms a part of the joint between the top and bottom parts, and the tensioning device serves to connect the top and bottom parts. The two housing sections are thus formed from the top and bottom parts. Cassettes of this type can be reused and thus, reloaded. The cassette halves, that is, the top and bottom parts, can be connected together in the segment of the joint opposite the dispensing slot by hinged pins, for example. The tensioning device then secures the connection between the top and bottom parts in the area of the dispensing slot so that opening the top and bottom parts is possible only after the tensioning device is released. This structure greatly simplifies reloading the cassette. The tensioning device is released, the empty roll core is removed, a new roll is inserted, the cassette is closed, and the tensioning device is reset.

It is preferable to have, on each end and associated with each housing section, wedge-shaped guide rails holding a movable locking clamp as a tensioning device. In other words, one guide rail is located, for example, on each end of the upper part, the other on the lower part. When the locking clamp is moved, both guide rails on each end are moved towards each other. Thus, the top and bottom parts or the two housing sections forming the dispensing slot are moved towards each other so that the width of the slot is reduced. When the locking clamp is moved in the opposite direction, the two housing sections or the top and bottom parts are moved away from each other by the effect of the preloaded spring tension, so that the width of the dispensing slot is enlarged. A specific width of the dispensing slot is thus assigned to each setting of the locking clamp on the guide rails.

It is advantageous for the guide rails to have several detent settings. This permits the cassette to be adjusted very easily to various predetermined widths for the dispensing slot. This is especially desirable if materials of different thicknesses, for example, film or paper, are to be used in the same cassette. For film, the locking clamp is shifted to a detent position producing a smaller width for the dispensing slot. For paper, which is thicker, the locking clamp is opened to a detent position that widens the dispensing slot. The dispensing slot should not be wider than the material to avoid the risk of incident light.

A particularly preferred embodiment has the top and bottom parts shaped like bearing shell sections that accept roll journals. When the tensioning device is in the closed position, the bearing shell sections apply pressure on the journals, preventing roll rotation. A further cassette requirement is that the roll must be secured against undesired twisting or unwinding during transport of the cassette. Twisting causes the material to touch the inner wall of the housing and possibly be scratched by the wall during transport. Pressure on the journals can be easily applied by the top and bottom sections being brought together by the movement of the tensioning device into the closed position and clamping the journals. At the same time, the web end protruding from the dispensing slot becomes clamped so that the roll is secured against rotation and the web against retraction into the cassette. Thus, the web can be maintained on the roll under a predetermined tension by a single operation without undergoing the risk of being twisted.

It is advantageous for the journals to be supported in the housing with the air of a low-friction synthetic resin. The frictional forces arising as the web unwinds can be minimized by the use of low-friction synthetic resins, thus ensuring more uniform and more efficient web transport, for example, in exposure devices. This is especially important, for example, in certain scanners, wherein the material, that is, film in this case, is exposed while being forwarded. The journals can be supported in the housing with the aid of semicircular bearing boxes and/or rings. This avoids having the entire journal or the entire housing made of low-friction synthetic resin. In particular, the low-friction synthetic resin can be made essentially from acetal resins.

What is claimed is:

1. In a lighttight cassette for supporting a roll of web material having a housing that includes a variable which dispensing slot formed by two sections of the housing and running substantially parallel to the axis of the supported roll, the improvement comprising said housing being a two-piece structure having a top part (2) and a bottom part (3) joined together in a detachable manner on the side opposite the dispensing slot (5) so that the dispensing slot (5) is formed as a segment of a joint between the top part (2) and the bottom part (3), both housing sections (2, 3) being positioned with respect to each other under preloaded tension so that the slot assumes its greatest width A, said cassette including a tensioning device (22) connecting the top part (2) and the bottom part (3) for opposing the preloaded tension and, therefore, externally adjusting tyler width of the dispensing slot (5).

2. Cassette in accordance with claim 1 with a roll of web material, characterized in that the dispensing slot (5) can be locked in a closed position (26) of the tensioning device (22), so that the web can be clamped between the housing sections (2, 3).

3. Cassette in accordance with claim 1, characterized in that each end (19) of each housing section (2, 3) has wedge-shaped guide rails (20, 21) holding a movable locking clamp (22) as a tensioning device.

4. Cassette in accordance with claim 3, characterized in that the guide rails (20, 21) have several detent positions (23–26).

5. Cassette in accordance with claim 1 with said roll of web material supported by journals (15), characterized in that the top part (2) and the bottom part (3) of the cassette form bearing shell sections (16, 17) supporting the journals (15) of the roll (11) in a manner such that, when the tensioning device (22) is in the closed position, the bearing shell sections (16, 17) apply a force on the journals (15) to prevent rotation of the roll (11).

6. Cassette in accordance with claim 5, characterized in that the journals (15) are supported in the housing by means of a low-friction synthetic resin.

7. Cassette in accordance with claim 6, characterized in that the journals (15) are supported in the housing by means of semicircular boxes and/or rings (18).

8. Cassette in accordance with claim 6, characterized in that the low-friction synthetic resins are essentially acetal resins.

* * * * *